United States Patent
Johansson et al.

(10) Patent No.: US 9,584,417 B2
(45) Date of Patent: Feb. 28, 2017

(54) MONITORING CONGESTION STATUS IN A NETWORK

(75) Inventors: Ingemar Johansson, Luleå (SE); Stefan Wänstedt, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 245 days.

(21) Appl. No.: 13/883,790

(22) PCT Filed: Nov. 8, 2010

(86) PCT No.: PCT/EP2010/067014
§ 371 (c)(1),
(2), (4) Date: May 7, 2013

(87) PCT Pub. No.: WO2012/062348
PCT Pub. Date: May 18, 2012

(65) Prior Publication Data
US 2013/0229920 A1 Sep. 5, 2013

(51) Int. Cl.
| H04L 12/70 | (2013.01) |
| H04L 12/801 | (2013.01) |
| H04W 28/02 | (2009.01) |
| H04L 12/833 | (2013.01) |

(52) U.S. Cl.
CPC ......... *H04L 47/11* (2013.01); *H04W 28/0205* (2013.01); *H04W 28/0284* (2013.01); *H04L 47/31* (2013.01)

(58) Field of Classification Search
None
See application file for complete search history.

(56) References Cited

U.S. PATENT DOCUMENTS

| 5,440,741 A | 8/1995 | Morales et al. |
| 5,537,414 A * | 7/1996 | Takiyasu et al. ............. 370/347 |
| 2002/0193118 A1 | 12/2002 | Jain et al. |
| 2003/0231593 A1* | 12/2003 | Bauman et al. ............. 370/235 |
| 2006/0159016 A1 | 7/2006 | Sagfors et al. |
| 2006/0240837 A1* | 10/2006 | Cave ............................ 455/450 |
| 2007/0281708 A1* | 12/2007 | Bakhuizen et al. .......... 455/450 |
| 2008/0198744 A1 | 8/2008 | Menth |
| 2009/0285196 A1* | 11/2009 | Lee et al. ..................... 370/345 |
| 2010/0278042 A1* | 11/2010 | Monnes ............. H04L 43/0894 370/230 |

(Continued)

FOREIGN PATENT DOCUMENTS

| CN | 1528061 A | 9/2004 |
| CN | 101053275 A | 10/2007 |

(Continued)

OTHER PUBLICATIONS

Ericsson: "E-DCH Scheduling-UE Request Procedures", *3GPP Draft*; vol. RAN WG1, no. Seoul, Korea; Sep. 15, 2004, XP050099380.

(Continued)

*Primary Examiner* — Ayaz Sheikh
*Assistant Examiner* — Sori Aga
(74) *Attorney, Agent, or Firm* — Baker Botts, LLP

(57) ABSTRACT

A network node arranged to monitor (531) the number of consecutive blocked scheduling attempts made by a terminal (532), and to identify a congestion event for the terminal (534) when the number of consecutive blocked scheduling attempts exceeds a threshold value (533).

17 Claims, 5 Drawing Sheets

(56) References Cited

U.S. PATENT DOCUMENTS

2011/0038264 A1* 2/2011 Ishii .............................. 370/238
2011/0199905 A1* 8/2011 Pinheiro ............... H04W 4/005
                                                            370/235

FOREIGN PATENT DOCUMENTS

| CN | 101116293 A | 1/2008 |
|----|-------------|--------|
| CN | 101124838 A | 2/2008 |
| WO | WO/2009/116497 | * 9/2009 |

OTHER PUBLICATIONS

"LTE: Evolved Universal Terrestrial Radio Access (E-UTRA); Medium Access Control (MAC) protocol specification (3GPP TS 36.321 version 9.3.0 Release 9)", *Technical Specification, ETSI*, vol. 3GPP RAN 2, No. V9.3.0, Jul. 1, 2010, XP014047468.

International Search Report for PCT/EP2010/067014, dated Jun. 7, 2011.

Search Report issued by the State Intellectual Property Office of People's Republic China for Application No. 201080070033.3, Oct. 30, 2014.

Second Office Action issued by the State Intellectual Property Office, P.R. China for Patent Application No. 201080070033.3, Aug. 17, 2015.

* cited by examiner

MONITORING CONGESTION STATUS IN A NETWORK

This application is the U.S. national phase of International Application No. PCT/EP2010/067014 filed 8 Nov. 2010 which designated the U.S., the entire content of which is hereby incorporated by reference.

TECHNICAL FIELD

The present application relates to a network node, a method in a network node and a computer readable medium.

BACKGROUND

A wireless network comprises at least one terminal communicating with at least one network node. For example, in UMTS (Universal Mobile Telecommunications System) a Node B communicates with at least one User Equipment (UE). In LTE (Long Term Evolution) an evolved Node B (eNodeB) communicates with at least one UE. In the uplink direction, comprising transmissions from the terminal to the network node, a scheduler in the network node determines when a terminal can transmit data to the network. The scheduler in the network node is alerted to the fact that a terminal has data to transmit by a scheduling request (SR) sent from the terminal to the network. If the network node receives more scheduling requests than it has resources to service, then some terminal's scheduling requests are not fulfilled. In this situation the terminal must store the data it has ready for transmission in a local buffer and resubmit the scheduling request. The buffer size has a finite limit and in a congestion event the terminal may fill its buffer. Once its buffer is filled, the terminal must drop packets, which has a negative impact on terminal functionality.

There is thus provided an improved method and apparatus for monitoring congestion status in a network.

3GPP technical specification 36.321 version 8.4.0, incorporated herein by reference, describes the Evolved Universal Terrestrial Radio Access (E-UTRA) Medium Access Control (MAC) protocol. This technical specification describes the MAC architecture and the MAC entity from a functional point of view. E-UTRA defines two MAC entities; one in the UE and one in the E-UTRAN. These MAC entities handle a plurality of transport channels. This technical specification describes how scheduling is performed in an E-UTRA network.

SUMMARY

There is provided a network node arranged to monitor the number of consecutive blocked scheduling attempts made by a terminal. The network node can then identify a congestion event for a particular terminal when the number of consecutive blocked scheduling attempts exceeds a threshold value. The threshold value is set such that congestion is identified before the terminal's buffer overflows.

If the network node is experiencing congestion then the number of terminals experiencing congestion will increase because the network node will not be able to satisfy all scheduling requests made by the terminals connected to it. Congestion in the network node may therefore be identified by the number of terminals connected to it that are experiencing congestion exceeding a threshold value. If the network node is experiencing congestion this is communicated to the connected terminals by the marking of packets sent to them. The congestion in the network node may be ameliorated by the terminals connected to it reducing the data rate of their connections.

The network node may be a Node B or an eNodeB. The terminal may be a wireless communications device or a user equipment.

There is further provided a method in a network node, the method comprising: monitoring the number of consecutive blocked scheduling attempts made by a terminal; and identifying a congestion event for the terminal when the number of consecutive blocked scheduling attempts exceeds a threshold value.

There is also provided a computer-readable medium, carrying instructions, which, when executed by computer logic, causes said computer logic to carry out any of the above defined methods.

BRIEF DESCRIPTION OF THE DRAWINGS

A method and apparatus for monitoring network node congestion status will now be described, by way of example only, with reference to the accompanying drawings, in which.

DETAILED DESCRIPTION

There is provided a method to obtain information about the congestion state in a terminal based on observation of the number of consecutive sub frames that the terminal serviced by a network node is prohibited from sending or receiving data. This information may then be used to mark data flows with a congestion notification. Further, there is provided a method wherein the congestion states for all terminals connected to a network node are monitored so as to determine the congestion state of the network node.

In a Long Term Evolution (LTE) network, a scheduler is placed in the Medium Access Control (MAC) layer of an evolved Node-B (eNodeB). To schedule the terminals in the uplink, the scheduler sends uplink grants on the Physical Downlink Control Channel (PDCCH) specifying which resource blocks (RBs) and which transport format to use. A terminal operating in the network supplies the eNodeB with information about the data in its buffers using two mechanisms; a scheduling request (SR) or buffer status reports (BSR). SRs are 1-bit notifications transmitted on a control channel (Physical Uplink Control Channel, PUCCH, or Random Access Channel, RACH) while the BSRs are transmitted on the data channel (Physical Uplink Shared Channel, PUSCH) mostly together with user data.

The scheduler within the MAC layer of the eNodeB schedules uplink transmissions for the terminals serviced by that eNodeB. Each terminal includes a buffer which is used to buffer data while the terminal waits for a transmission slot to transmit the data to the eNodeB. The terminal notifies the eNodeB that it has data that it would like to transmit. If the terminal has a valid PUCCH resource for a scheduling request configured in any transmission time interval (TTI) it sends a one bit scheduling request at the appropriate time. Otherwise, the terminal initiates a random access procedure and cancels all pending scheduling requests.

Figure 1:
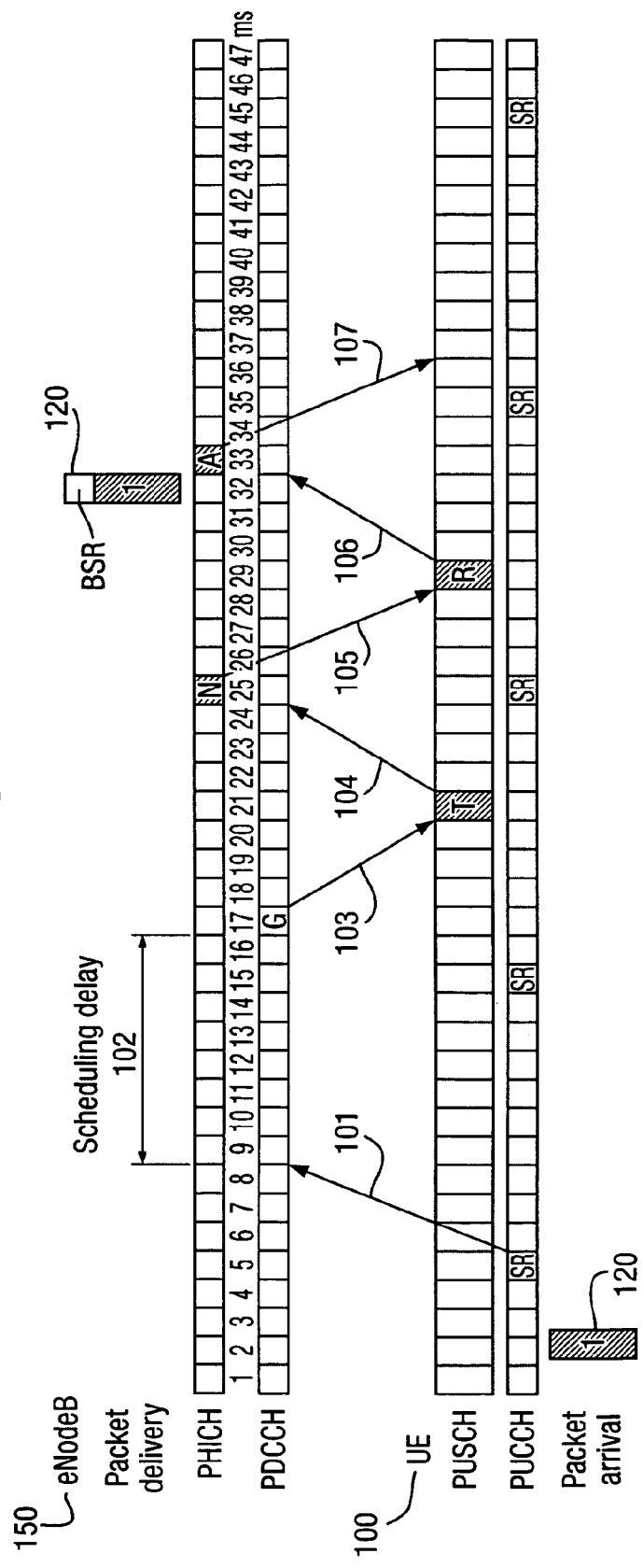
FIG. 1 illustrates a plurality of transmission time intervals (TTIs) for communications between a UE 100 and an eNodeB 150.

FIG. 1 illustrates a plurality of transmission time intervals (TTIs) for communications between a UE 100 and an eNodeB 150. At t=2 ms, a data packet 120 is formed in the UE 100 ready for transmission to the eNodeB 150. The terminal 100 may send a scheduling request (SR) to the eNodeB 150 using PUCCH, but may only do so at predefined points in time determined by a D-SR interval. The delay between the time that a data packet for transmission is generated and the time that the scheduling request is transmitted can be as large as the D-SR interval.

At t=5 ms the first SR time slot comes for the UE 100 and it transmits 101 an SR to eNodeB 150. The eNodeB 150 receives the SR from UE 100 and after a scheduling delay 102 grants permission to transmit 103 (G) to the UE 100. eNodeB 150 instructs the UE 100 of this at t=17 ms using PDCCH (physical downlink control channel). At t=21 ms the UE 100 transmits 104 (T) the data packet 120 to eNodeB 150 using the PUSCH. This transmission is received by the eNodeB 150 but is inaccurate or incomplete and so at t=25 ms the eNodeB 150 sends a not-acknowledged message 105 (N) to the UE 100 using PHICH (Physical HARQ Indicator Channel, HARQ=hybrid automatic repeat request). At t=29 ms the UE 100 retransmits 106 (R) the data packet to the eNodeB 150. The data packet is successfully received by the eNodeB 150 and at t=33 ms the eNodeB 150 sends acknowledgment 107 (A) to the UE 100.

Packet-switched networks using shared resources between terminals can experience congestion. Congestion will happen when the sum of traffic of the ingress nodes of the shared resource exceeds the sum of the traffic of the egress nodes of the same shared resource. A typical example of congestion arises in a router with a specific number of connections. Even if the router has processing power enough to re-route the traffic according to the estimated link throughput, the current link throughput might restrict the amount of traffic the outgoing links from the router can cope with. Hence, the buffers of the router will begin to fill up and eventually they will overflow. The network now experiences congestion and the router is forced to drop packets as explained below.

The normal behavior for any routing node is to provide buffers that can manage a certain amount of variation in input/output link capacity and hence absorb minor congestion occurrences. However, when the congestion is severe enough, the routing node will eventually drop packets. Transport protocols are available to mitigate the effects of dropped packets.

The Transmission Control Protocol (TCP) is a connection-oriented, congestion-controlled protocol. For TCP traffic, a dropped packet will be detected by the sender since no ACK is received for that particular packet and a re-transmission will occur. Further, the TCP protocol has a built in rate adaptive feature which will lower the transmission bit-rate when packet losses occur and re-transmissions happen on the IP layer. Hence, TCP can be considered as reliable and is well suited to respond to network congestion.

Figure 2:
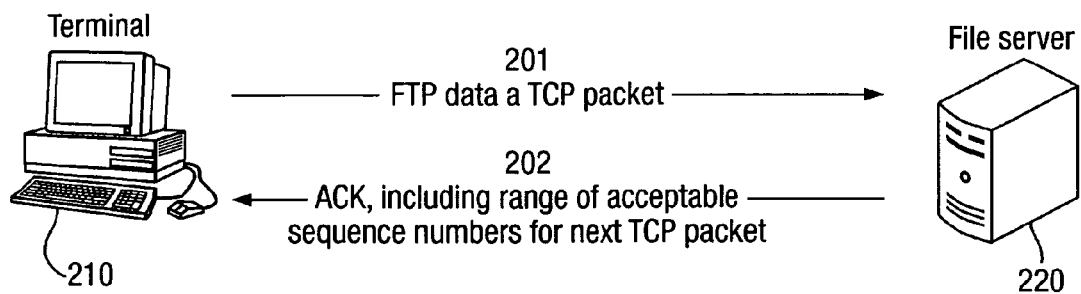
FIG. 2 illustrates a typical usage of TCP.

FIG. 2 illustrates a typical usage of TCP, where a packet containing file transfer protocol (FTP) data is sent 201 from a terminal 210 to a file server 220. Upon receipt of the packet, the file server 200 sends 202 an acknowledgement message to the terminal 210. The acknowledgement message may include a range of acceptable sequence numbers for the next TCP packet.

The User Datagram Protocol (UDP) is a connectionless transport protocol that only provides a multiplexing service with an end-to-end checksum. UDP traffic thus does not have similar mechanisms as TCP to respond to congestion. UDP traffic is inherently not reliable because the delivery of any particular packet is not guaranteed. Missing UDP packets will not be re-transmitted unless the application layer using the transport service provided by UDP has some specialized feature which allows this. UDP by itself does not respond in any way to network congestion, although application layer mechanisms may implement some form of response to congestion.

The Datagram Congestion Control Protocol (DCCP) is a transport protocol that provides bidirectional unicast connections of congestion-controlled unreliable datagrams. DCCP is suitable for applications that transfer fairly large amounts of data and that can benefit from control over the tradeoff between timeliness and reliability.

For packet-switched networks that are fixed, a link is typically said to be congested when the offered load on the link reaches a value close to the capacity of the link. In other words, congestion is defined as the state in which a network link is close to being completely utilized by the transmission of bytes. This is largely because the capacity of the link is constant over time, and because the physical characteristics of the ingress and of the egress links are similar. When the offered load exceeds the capacity of the link, the transmitter must start dropping packets, unless it has the possibility to buffer data until the situation improves. If the congested condition remains over a period of time, buffer occupancy may grow beyond the buffer capacity of the transmitter, at which point there is no other resort available than to drop packets.

In wireless networks, such as wireless LAN (IEEE 802.11 a/b/g), or mobile networks such as High-speed packet access (HSPA), Long-term Evolution (LTE) and Worldwide Interoperability for Microwave Access (WiMAX) networks; defining congestion is more complex than simply relating to capacity in terms of the number of bits that can be transmitted. Congestion in wireless networks can be defined as the state in which the transmission channel is close to being completely utilized.

For example, in the case of LTE the base station (eNodeB) will manage on the MAC layer re-transmissions to the mobile terminal (user equipment, UE) which will impact on the amount of traffic the eNodeB can provide throughput for at any given moment. The more re-transmissions required for successful reception at the UE, the less available resources (e.g. transmission power, number of available transmission slots) are available to provide throughput for other terminals. In the case of LTE, the base station (eNodeB) will also manage how much redundancy is added to protect the data against transmission errors by selecting a proper Modulation and Coding Scheme (MCS) for the physical channel. The eNodeB then matches the resulting bits to a number of resource blocks (RB). The more conservative the MCS that is selected for the transmission (e.g. for UEs in bad radio conditions), the less available resource blocks are available to provide throughput for terminals.

Figure 3:
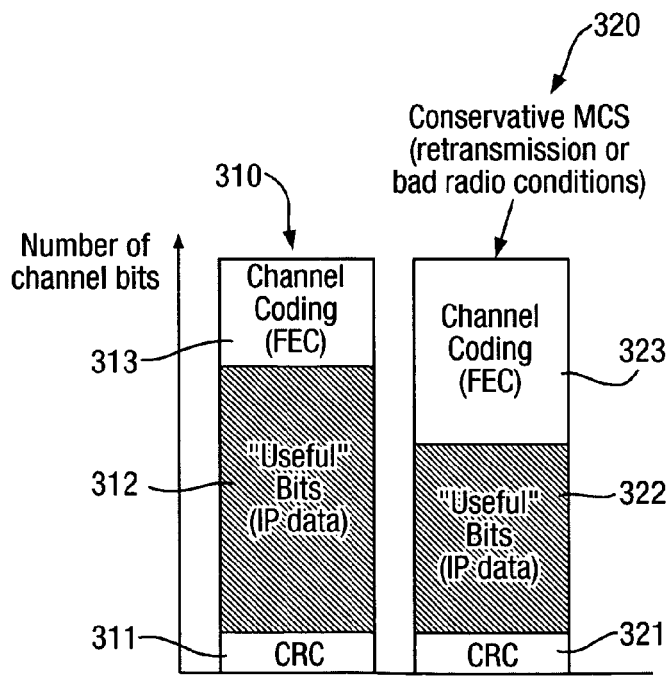
FIG. 3 shows the relative proportions of channel bit usage for a standard MCS 310 and for a conservative MCS 320.

The total capacity of the transmission channel is distributed between different receivers having different radio conditions; this means that the shared resources are consumed partly by varying levels of redundancy (retransmissions, channel coding) necessary to protect the data that is useful to the terminal (payload data such as IP packets). This is illustrated in FIG. 3 which shows the relative proportions of channel bit usage for a standard MCS 310 and for a conservative MCS 320. Both coding schemes use the same number of channel bits for cyclic redundancy checks, CRC, 311, 321. The number of payload bits 312 in the standard MCS 310 is greater than the number of payload bits 322 in the conservative MCS 320. This is because the conservative MCS 320 requires more channel coding bits 323 than the channel coding bits 313 required by the standard MCS 310.

The above discussion focuses on uplink transmission in communication from a terminal to a network node. It should be noted that similar principles apply for downlink transmission.

A typical scheduler for an LTE node will, for every TTI, check all UEs in a cell to determine if they have data to send. The UEs that have data to send are then listed in a list of schedulable UEs.

In low load situations each UE will be granted transmission resources very quickly. However, as network load increases it will be more difficult for the UEs to be granted transmission resources. In this case some UEs will then be blocked from transmitting. Which UEs are blocked depends on factors such as: channel quality; or type of scheduler.

According to the method disclosed herein, the eNodeB logs, for each UE, the number of consecutive TTIs a UE is blocked from transmission. A UE is considered as blocked from transmission when it has submitted a scheduling request but that request is not granted by the eNodeB. A congestion event is raised if the number of consecutive TTIs a UE is blocked from transmission exceeds a given threshold.

The functionality of the scheduler may be understood with the aid of the following pseudo code, the code is run for each TTI (1 ms).

```

for each UE in cell
    if UE has data
        add UE to schedulable
    end
end
threshold = min(maxTh, max(minTh, number_of_schedulable_UEs))
for each UE in schedulable
    try to schedule UE
    if scheduling OK
        numberOfBlockings = 0
    else
        numberOfBlockings = numberOfBlockings + 1
        if numberOfBlockings > threshold
            raise congestion event for UE!
        end
    end
end

```

The minTh and maxTh values are configurable, values that have been found to work well are minTh=15 and maxTh=120. The threshold value is equal to the number of schedulable terminals, unless that number is less than minTH, in which case the threshold is minTH, and unless that number is greater than maxTH, in which case the threshold is maxTH. The pseudocode above is an example that describes the method whereby the number of consecutive blocked scheduling attempts is logged, but there are a number of possible variations to this.

Figure 4A:
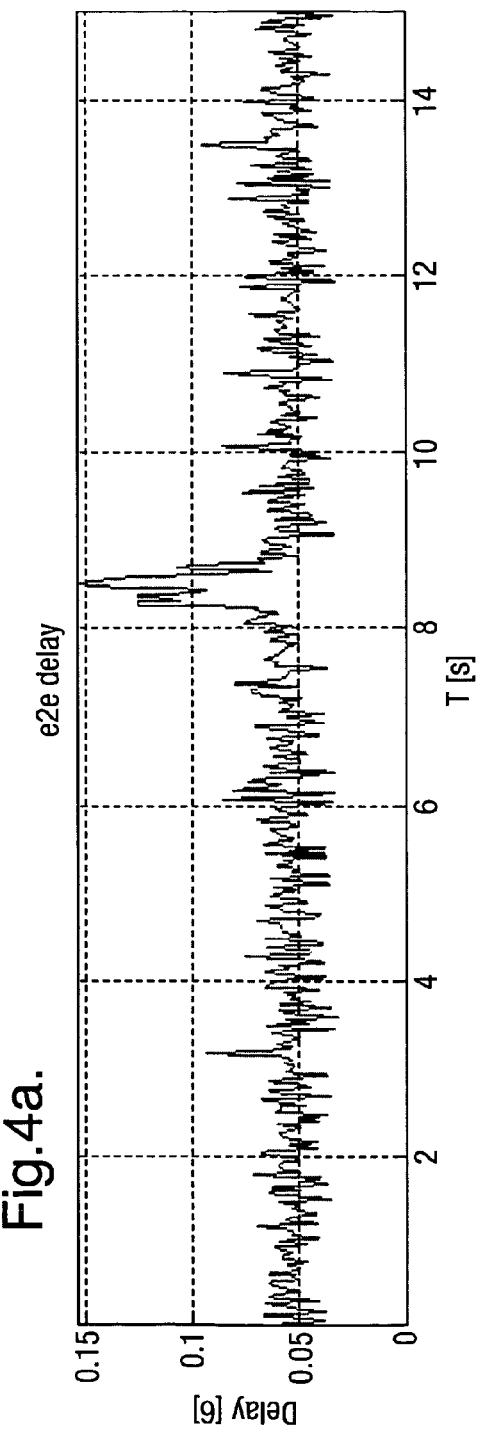
FIGS. 4a and 4b show relationship between the end-to-end delay and the number of consecutive blocking events in a transmission stream.
Figure 4B:
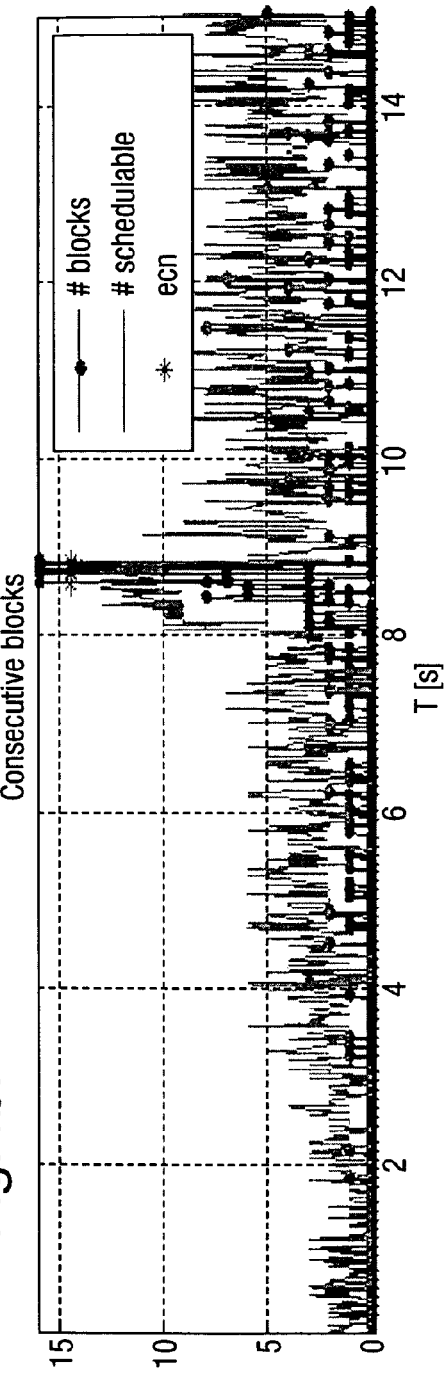

FIG. 4a shows the end-to-end (e2e) delay for a 300 kbps video flow, there is a spike in the transmission delay at around T=8.5 seconds. FIG. 4b shows how the number of consecutive blocking events (numberOfBlockings) increases rapidly with the transmission delay. An Explicit Congestion Notification is set when the numberOfBlockings exceeds the threshold, which in this case is the minimum threshold of 15.

Figure 5:
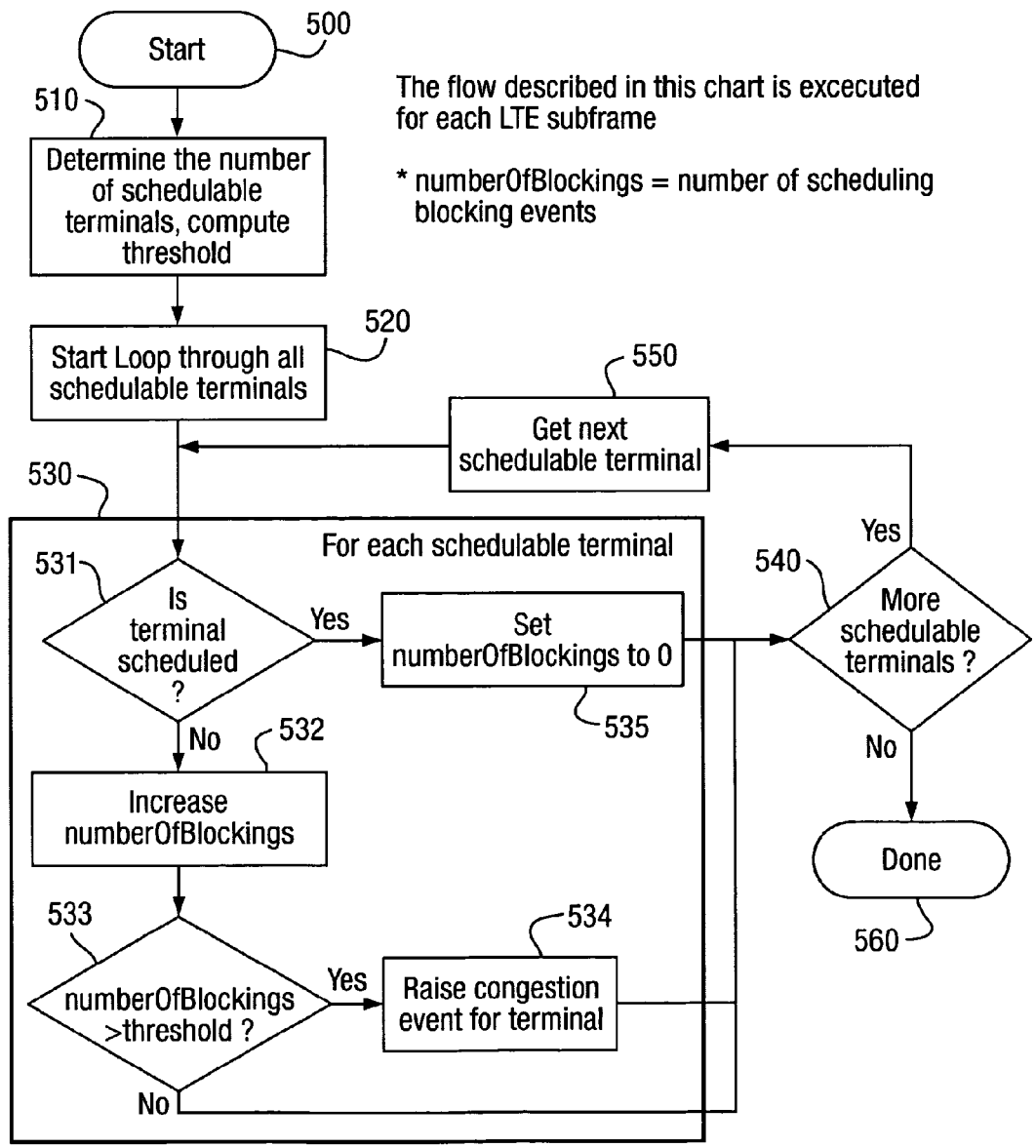
FIG. 5 shows a flowchart outlining the process described herein.

The flowchart of FIG. 5 outlines the process described in the pseudo code above. The process begins 500 and the number of schedulable terminals is determined 510. A terminal is schedulable if it has at least one data packet ready for transmission. From the number of schedulable terminals the threshold value of the number of blockings giving rise to a congestion event is derived. At 520 a loop process is started for each schedulable terminal.

Loop 530 is performed for each schedulable terminal. Loop 530 begins with a determination 531 as to whether the terminal is scheduled. If the terminal is schedulable but not scheduled then the number of blockings total for the terminal is incremented 532. At 533 it is determined whether the current number of blockings for the terminal is greater than the threshold for congestion. If determination 533 is negative then the process moves on to determine 540 whether there are more schedulable terminals. If determination 533 is positive (the current number of blockings for the terminal is greater than the threshold for congestion), then a congestion event 534 is raised for that terminal and the process then moves on to determine 540 whether there are more schedulable terminals.

If, at 531, it is determined that the terminal is scheduled then the number of blockings total is reset 535 to zero and the process then moves on to determine 540 whether there are more schedulable terminals.

If, at 540, it is determined that there are more schedulable terminals then information for the next schedulable terminal is retrieved and loop 530 is begun again. Conversely, if at 540 it is determined that there are no more schedulable terminals then the process finishes 560.

Figure 6:
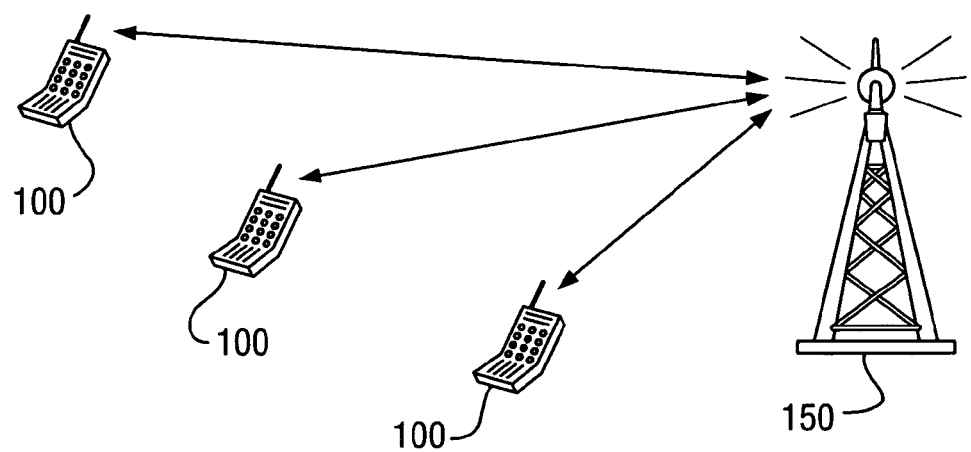
FIG. 6 illustrates a plurality of terminals 100 communicating with a network node 150.

FIG. 6 illustrates a plurality of terminals 100 communicating with a network node 150.

A further enhancement of the method disclosed herein provides for the combination of this metric for all terminals in a cell. The cell may be defined as the area served by an eNodeB. Such a combination comprises raising a cell-wide congestion event when, for example, more than a threshold proportion of the individual terminals raise a congestion event. The threshold proportion may be a proportion of the number of schedulable terminals. For example, the proportion may be a half. The threshold may be a proportion of the total number of terminals serviced by the network node.

Once a congestion event is identified for a specific terminal (or a group of terminals) a congestion flag may be set to communicate the congestion event to affected parties. Where Explicit Congestion Notification (ECN) is employed the congestion flag may comprise the setting of ECN-CE (ECN Congestion Experienced) for all ECN capable transports (ECT) for the given terminal or group of terminals. ECN markers are put into the IP header of packets and so this must be done on a protocol layer where the IP header is visible. The congestion event described herein is identified in the RLC layer, and as the IP header is not visible on this layer the congestion event must be fed up the protocol stack to e.g. the Packet Data Convergence Protocol (PDCP) layer, where the IP header is visible. For any non-ECN capable transports, the identification of a congestion event for a terminal may be used to determine that at least one packet related to that terminal should be dropped.

The method and apparatus disclosed herein gives a congestion indicator that is generic to QCI (quality of service class indicator) and still fast in its reaction to congestion.

It will be apparent to the skilled person that the exact order and content of the actions carried out in the method described herein may be altered according to the requirements of a particular set of execution parameters. Accordingly, the order in which actions are described and/or claimed is not to be construed as a strict limitation on order in which actions are to be performed.

Further, while examples have been given in the context of particular communications standards, these examples are not intended to be the limit of the communications standards to which the disclosed method and apparatus may be applied. For example, while specific examples have been given in the context of LTE, the principles disclosed herein can also be applied to a WCDMA system, other wireless communication system, and indeed any communication system which may experience congestion.

The invention claimed is:

1. A network node arranged to:
    during a transmission time interval, determining a number of schedulable terminals having data to transmit;
    based on the number of schedulable terminals having data to transmit during the transmission time interval, deriving a first threshold value, the first threshold value comprising a number of consecutive blocking scheduling attempts giving rise to a congestion event;
    monitor the number of consecutive blocked scheduling attempts made by a terminal of the schedulable terminals;
    identify a congestion event for the terminal when the number of consecutive blocked scheduling attempts exceeds the first threshold value;
    monitor a number of consecutive blocked scheduling attempts made by each terminal of the schedulable terminals; and
    identify a congestion event for the network node when a number of terminals serviced by the network node having simultaneously identified congestion events exceeds a second threshold value.

2. The network node of claim 1, wherein the second threshold value is a proportion of the of number of schedulable terminals.

3. The network node of claim 1, wherein the identification of a congestion event for the terminal is performed at a first layer of a protocol stack of the network node where an IP header is not visible, and in response to identification of a congestion event for a terminal, the network node sends a second layer of the protocol stack of the network node where the IP header is visible, the second layer higher than the first layer.

4. The network node of claim 1, wherein in response to identification of a congestion event for a terminal, the data packets for the terminal are marked with a congestion indicator.

5. The network node of claim 1, wherein in response to the identification of a congestion event for a terminal, the network node sets a flag in the IP header of a packet received from the terminal.

6. The network node of claim 1, wherein in response to the identification of a congestion event for a terminal, the network node makes an Explicit Congestion Notification on at least one data packet for the terminal.

7. The network node of claim 1, wherein in response to the identification of a congestion event for the terminal, at least one data packet for the terminal is dropped.

8. A method in a network node, the method comprising:
    during a transmission time interval, determining a number of schedulable terminals having data to transmit;
    based on the number of schedulable terminals having data to transmit during the transmission time interval, deriving a first threshold value, the first threshold value comprising a number of consecutive blocking scheduling attempts giving rise to a congestion event;
    monitoring the number of consecutive blocked scheduling attempts made by a terminal of the schedulable terminals;
    identifying a congestion event for the terminal when the number of consecutive blocked scheduling attempts exceeds the first threshold value;
    monitoring a number of consecutive blocked scheduling attempts made by each terminal of the schedulable terminals; and
    identifying a congestion event for the network node when a number of terminals serviced by the network node having simultaneously identified congestion events exceeds a second threshold value.

9. The method of claim 8, wherein the second threshold value is a proportion of the number of schedulable terminals.

10. The method of claim 8, wherein the identification of a congestion event for the terminal is performed at a first layer of a protocol stack of the network node where an IP header is not visible, and in response to identification of a congestion event for a terminal, the method comprises notifying a second layer of the protocol stack of the network node where the IP header is visible, the second layer higher than the first layer.

11. The method of claim 8, wherein in response to identification of a congestion event for a terminal, the data packets for the terminal are marked with a congestion indicator.

12. The method of claim 8, wherein in response to the identification of a congestion event for a terminal, the method further comprises setting a flag in the IP header of a packet received from the terminal.

13. The method of claim 8, wherein in response to the identification of a congestion event for a terminal, the method further comprises making an Explicit Congestion Notification on at least one data packet for the terminal.

14. The method of claim 8, wherein in response to the identification of a congestion event for the terminal, at least one data packet for the terminal is dropped.

15. A non-transitory, computer-readable medium, carrying instructions, which, when executed by computer logic, causes said computer logic to carry out any of the methods defined by claim 8.

16. The network node of claim 1, wherein deriving the first threshold value comprises:
    if the number of schedulable terminals is between a minimum threshold value and a maximum threshold value, setting the first threshold value to the number of schedulable terminals;
    if the number of schedulable terminals is less than the minimum threshold value, setting the second threshold value to the minimum threshold value; and
    if the number of schedulable terminals is greater than the maximum threshold value, setting the second threshold value to the maximum threshold value.

17. The method of claim 8, wherein deriving the first threshold value comprises:

if the number of schedulable terminals is between a minimum threshold value and a maximum threshold value, setting the first threshold value to the number of schedulable terminals;

if the number of schedulable terminals is less than the minimum threshold value, setting the second threshold value to the minimum threshold value; and if the number of schedulable terminals is greater than the maximum threshold value, setting the second threshold value to the maximum threshold value.

\* \* \* \* \*